J. B. AIKEN.
Hose-Carriage.
No. 226,012. Patented Mar. 30, 1880.
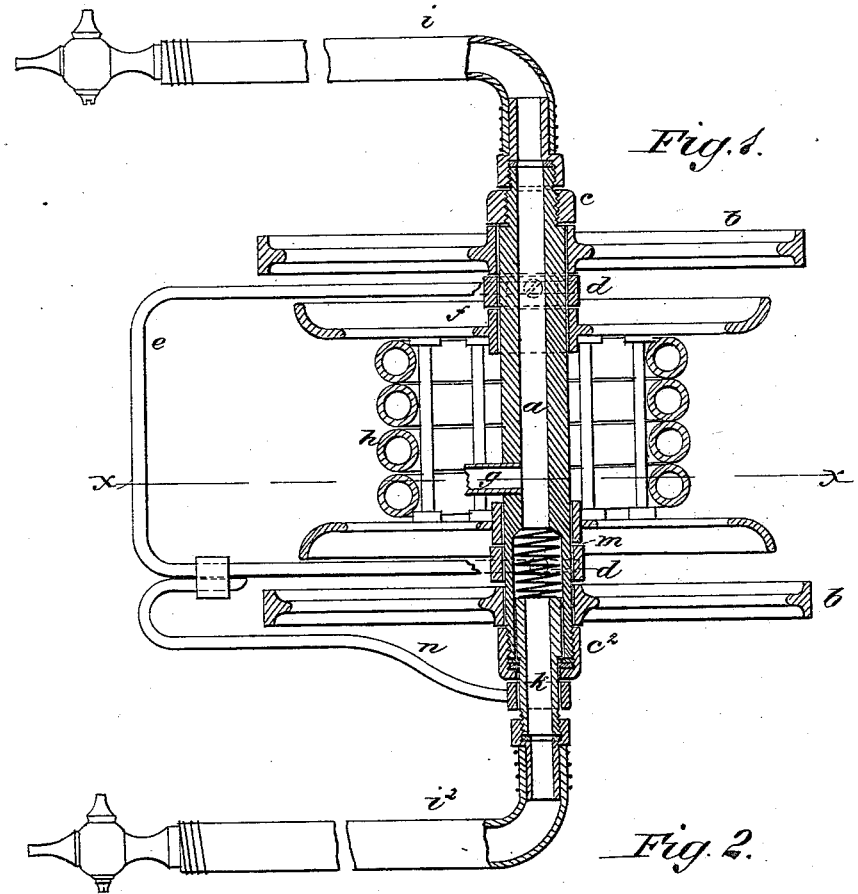
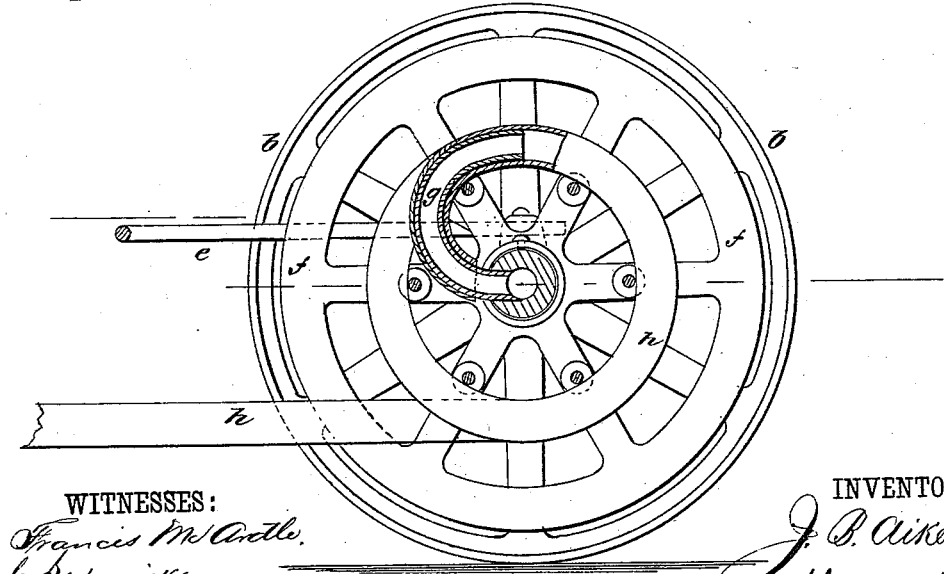
WITNESSES:
Francis McArdle
C. Sedgwick
INVENTOR:
J. B. Aiken
BY Munn & Co.
ATTORNEYS.

United States Patent Office.

JONAS B. AIKEN, OF FRANKLIN, NEW HAMPSHIRE.

HOSE-CARRIAGE.

SPECIFICATION forming part of Letters Patent No. 226,012, dated March 30, 1880.

Application filed January 13, 1880.

*To all whom it may concern:*

Be it known that I, JONAS B. AIKEN, of Franklin, in the county of Merrimack and State of New Hampshire, have invented a new and useful Improvement in Hose-Carriages, of which the following is a specification.

My improvements relate to hose-carriages wherein the reel is fitted upon a tubular axle to which the hose and service-pipe are connected, so that the water passes through the hose to the tubular axle; and my invention consists in certain novel features of construction, particularly the manner of fitting the reel and the carriage-wheels upon the hollow axle and the connections of the discharge-pipes, which will be described hereinafter with reference to the accompanying drawings, forming part of this specification.

Figure 1 is a sectional plan view of the hose-carriage. Fig. 2 is a vertical section on line $x\ x$ of Fig. 1.

Similar letters of reference indicate corresponding parts.

The carriage proper consists of the tubular axle $a$ and wheels $b\ b$, which wheels are loose upon the axle and are held in position by the nuts $c$ on the outer ends of the axle $a$.

The collars $d$ are placed loosely on the axle, between the wheels and reel, and to these collars $d$ are attached the shafts $e$, by which the hose-carriage is pushed or drawn to the location desired.

Upon the axle $a$, and between the collars $d$, the reel $f$ is secured, so that the reel and axle revolve together with the wheels as bearings. From the axle $a$, within the sides of the reel, projects a short pipe or nipple, $g$, upon which is connected the inner end of the hose $h$, which is to be wound upon the reel.

The reel $f$ is of usual construction, and by the connections described may be turned to wind or unwind the hose without disturbing the connection to the tubular axle.

The discharge or service pipes $i\ i^2$ are connected to the outer ends of the tubular axle $a$ by two methods, either or both of which may be used at pleasure. By the first method the service-pipe $i$ is connected directly to the end of the axle by an ordinary screw-coupling. By the second method the pipe $i^2$ is connected to a shouldered sleeve, $k$, that enters the axle $a$, wherein it is held in position by the nut $c^2$ on the axle. The joint between the nut $c^2$ and sleeve $k$ is packed, and at the inner end of the sleeve $k$ a spiral spring, $m$, is fitted, that tends to force the sleeve outward against the packing, and thus render additional security against leakage at the joint.

On the sleeve $k$, between the connection of the service-pipe $i^2$ and the nut $c^2$, is a collar, which is secured firmly to the sleeve. To this collar is attached the rod or yoke $n$, which is connected to shafts $e$. The purpose of this collar and rod is to prevent the sleeve from revolving with the reel and the service-pipe $i^2$ from twisting.

The service-pipes $i\ i^2$ will be of any required length and fitted with nozzles.

In use the outer end of the hose $h$, that is wound on the reel, is to be connected to the hydrant or other source of supply.

The hose $h$ may be unwound to the extent required by pushing or drawing the carriage to the location where it is desired to use the water, which is then delivered through the service-pipes $i\ i^2$.

Having thus described my invention, I claim as new and desire to secure by Letters Patent—

1. In hose-carriages, the tubular axle $a$, loose wheels $b\ b$, reel $f$, hose $h$, connected to axle $a$ between the wheels, and service pipe or pipes coupled to the outer ends of the axle, combined substantially as shown and described.

2. In hose-carriages, the reel $f$ and tubular axle $a$, fitted to turn together and sustained on the wheels $b\ b$, substantially as shown and described.

3. In hose-carriages, the threaded tube $k$ and nut $c$, combined with the tubular axle $a$, substantially as and for the purposes set forth.

4. In combination with the coupling-tube $k$, axle $a$, and nut $c$, the spiral spring $m$, fitted within the axle at the end of tube $k$, substantially as and for the purposes set forth.

JONAS B. AIKEN.

Witnesses:
GEO. D. WALKER,
C. SEDGWICK.